United States Patent
Yeh et al.

(10) Patent No.: US 12,052,068 B2
(45) Date of Patent: Jul. 30, 2024

(54) SYSTEMS AND METHODS FOR RESETTING ELECTRONIC DEVICES

(71) Applicant: GOOGLE LLC, Mountain View, CA (US)

(72) Inventors: Chia-Hang Yeh, Campbell, CA (US); Emeka Godswill Ugwu, Milpitas, CA (US); Adam Umar Abdul Kareem, Bolingbrook, IL (US); Jerry Chung-Hung Chen, Castro Valley, CA (US)

(73) Assignee: GOOGLE LLC, Mountain View, CA (US)

( * ) Notice: Subject to any disclaimer, the term of this patent is extended or adjusted under 35 U.S.C. 154(b) by 175 days.

(21) Appl. No.: 17/661,465

(22) Filed: Apr. 29, 2022

(65) Prior Publication Data

US 2022/0352928 A1   Nov. 3, 2022

Related U.S. Application Data

(60) Provisional application No. 63/201,426, filed on Apr. 29, 2021.

(51) Int. Cl.
*H04B 5/77* (2024.01)
*H04B 5/26* (2024.01)

(52) U.S. Cl.
CPC .............. *H04B 5/77* (2024.01); *H04B 5/266* (2024.01)

(58) Field of Classification Search
None
See application file for complete search history.

(56) References Cited

U.S. PATENT DOCUMENTS

2005/0237161 A1\* 10/2005 Lee .................. H04W 52/0225
340/426.36

\* cited by examiner

*Primary Examiner* — K. Wong
(74) *Attorney, Agent, or Firm* — Brake Hughes Bellermann LLP

(57) ABSTRACT

A method for a hard reset of a target electronic device includes establishing a near field communications (NFC) channel to the target electronic device, receiving a wireless signal at the target electronic device over the NFC channel, and comparing a signature of the received wireless signal with a predefined characteristic signature of a reset command signal. Responsive to the comparing, the method includes generating a reset signal resetting the target electronic device.

23 Claims, 10 Drawing Sheets

Output of TX coil and output from RX rectifier

700A

Establishing a wireless near field communications (NFC) channel from an electronic device to a target electronic device
710

Sending a wireless signal from the electronic device to the target electronic device over the NFC channel, the wireless signal having a predefined characteristic signature of a reset command signal for resetting the target electronic device.
720

```
Establishing a wireless near field communications (NFC)
channel to a target electronic device
                         730
```

```
Receiving a wireless signal at the target electronic device over
the NFC channel
                         740
```

```
Comparing a signature of the received wireless signal with a
predefined characteristic signature of a reset command signal
                         750
```

```
Responsive to the comparing, generating a reset signal
resetting the target electronic device
                         760
```

FIG. 7B

SYSTEMS AND METHODS FOR RESETTING ELECTRONIC DEVICES

CROSS REFERENCE TO RELATED APPLICATION

This application claims priority to, and the benefit of, U.S. Provisional Patent Application No. 63/201,416, filed Apr. 29, 2021, which is hereby incorporated by reference in its entirety herein.

TECHNICAL FIELD

The subject matter of the present disclosure relates to systems and methods for resetting electronic devices.

BACKGROUND

Most electronic or electrical devices are state-based machines. Restarting or resetting electronic or electrical devices often fixes, or at least helps troubleshoot, any issues with hardware and software in the devices. Resetting a device may involve turning the device off and on again. Resetting the device can bring the device back to a "fresh state". If a device or software program gets stuck, resetting the device will reset it to a fresh state (e.g., its initial state). This makes "turning it off and on again" a good first step when troubleshooting an electronic device or restoring the electronic device to a working state.

SUMMARY

In a general aspect, a method for a hard reset of a target electronic device includes establishing a near field communications (NFC) channel to the target electronic device, receiving a wireless signal at the target electronic device over the NFC channel, and comparing a signature of the received wireless signal with a predefined characteristic signature of a reset command signal. Responsive to the comparing, the method includes generating a reset signal resetting the target electronic device.

In a general aspect, an electronic device includes a near field communications (NFC) tag coupled to a resettable component of the electronic device. NFC tag includes an NFC receiver coil configured to receive a wireless signal, a rectifier configured to rectify the received wireless signal, and a logic circuit. The logic circuit is configured to determine whether a signature of the rectified wireless signal corresponds to a predefined characteristic signature of a reset command signal, and responsive to the determination, apply a reset signal to the resettable component of the electronic device.

BRIEF DESCRIPTION OF THE DRAWINGS

FIG. 7A illustrates an example method for initiating or triggering resetting of a target electronic device from an electronic device, in accordance with the principles of the present disclosure.

FIG. 7B illustrates an example method for resetting a target electronic device, in accordance with the principles of the present disclosure.

DETAILED DESCRIPTION

Figure 1:
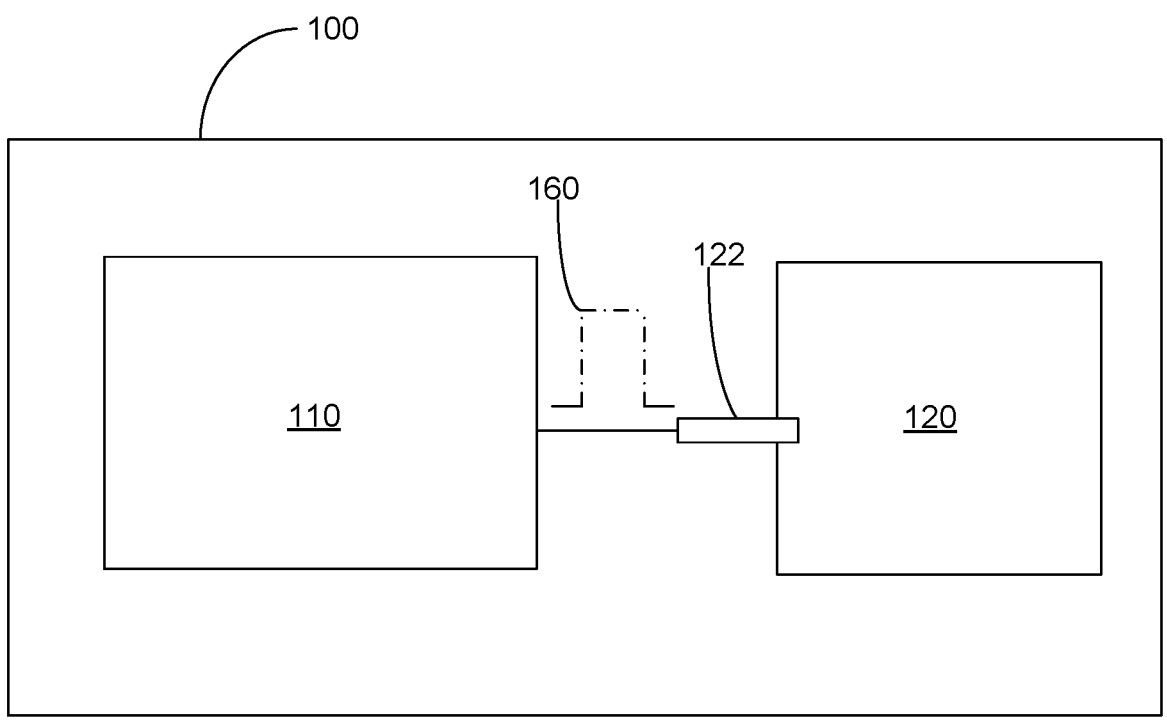
FIG. 1 is a block diagram illustration of an electronic device equipped with an NFC tag for wireless resetting of the electronic device, in accordance with the principles of the present disclosure.

An electronic or electrical device may need to be restarted or reset in certain circumstances (such as system halt, non-responsiveness, software corruption, looping behavior, etc.). Restarting or resetting the electronic or electrical device can involve turning off power, and then turning on power that energizes a circuit in the device. For devices (e.g., desktop computers) that have circuits that are powered by an external power source (e.g., a battery or a wall power cord), the restarting or resetting may simply involve disconnecting and reconnecting the external power source. For devices (e.g., portable computing devices such as laptops, tablet computers, smartphones, etc.) that have circuits that are powered by an internal power source (e.g., an internal battery), the restarting or resetting may involve disconnecting and reconnecting the internal battery. The devices may include externally accessible "reset" buttons (or pins) that can be user-operated (e.g., finger operated) to reset one or more circuits or components in the devices.

In electronics and technology, a reset button is a button (or switch) that can reset a device. On video game consoles, the reset button restarts the game, losing the player's unsaved progress. On personal computers, the reset button clears the memory and reboots the machine forcibly. Reset buttons are found on circuit breakers to reset the circuit. Often in small-sized consumer electronic devices (e.g., computers, laptops, and mobile phones, etc.) because of space limitations, a reset button may be present as a small physical button, possibly in a recess or reset hole in the device case to prevent it from being pressed accidentally. Such a physical reset button may only be accessible by a pin, wire, or similarly thin object (e.g., a paper clip).

Some electronic devices (e.g., smart glasses, smart watches, articles of clothing and/or accessories that incorporate computer and advanced electronic technologies, and other devices in wearable technology, fashion technology, tech togs, skin electronics or fashion electronics, etc.) have more acute space limitations that makes it impractical to include physical reset buttons in the devices. Even if small-size physical reset buttons could be provided, for example, in the wearable electronic devices, these could be difficult, inconvenient, or impractical for users to operate. Further, for some electronic devices (e.g., smart watches, articles of clothing and/or accessories) it may be best to enclose the electronic devices in completely sealed cases (e.g., water proof cases) with no openings (e.g., reset holes) to avoid the risk of moisture penetration (which could damage the electronic devices). Thus, there is a need for techniques for resetting electronic devices where reset holes or external reset buttons are not available or not practical to use.

Systems and methods (collectively "solutions") for resetting an electronic device (e.g., wearable electronic device) wirelessly are disclosed herein. The solutions involve deploying reset circuitry in the electronic device that can be activated wirelessly. The reset circuitry may be included in, or coupled to, a near field communications (NFC) tag deployed in the electronic device, and activated wirelessly by an NFC activation signal received from another device (e.g., as a smart phone, a computer, a device with a processor and a memory, etc.) capable of NFC communications with the electronic device. A hardware reset of the electronic device may be achieved without use of software in the electronic device. The solutions may be used to reset the electronic device without use of any physical reset buttons on the electronic device and without direct physical intervention in the electronic device by users.

FIG. 1 is a schematic diagram illustrating an electronic device 100 equipped with an NFC tag for wireless resetting of the electronic device, in accordance with the principles of the present disclosure.

Electronic device 100 (e.g., a wearable electronic device) may include an NFC tag 110 interfaced with a resettable component 120 (e.g., a circuit, a processor, etc.) of the device. NFC tag 110 may be coupled to a reset pin 122 on resettable component 120. In example implementations, resettable component 120 may, of example, be a system-on-chip (SOC) of the device. In other implementations, resettable component 120 may, of example, be a power management integrated circuit (PMIC) or other power supply circuit of the device. Reset pin 122 on resettable component 120 may be configured to reset resettable component 120 upon application of a reset signal 160 (e.g., a voltage or current signal) generated, for example, by NFC tag 110. NFC tag 110 may, for example, be activated to generate reset signal 160 based on a reset initiation or trigger signal transmitted (wirelessly) by another electronic device in NFC communications with electronic device 100.

NFC tag 110 in electronic device 100 may be referred to hereinafter as the receiver tag, and an NFC component in the another electronic device (e.g., device 210, FIG. 2A) may be referred to hereinafter as the NFC transmitter.

Figure 2A:
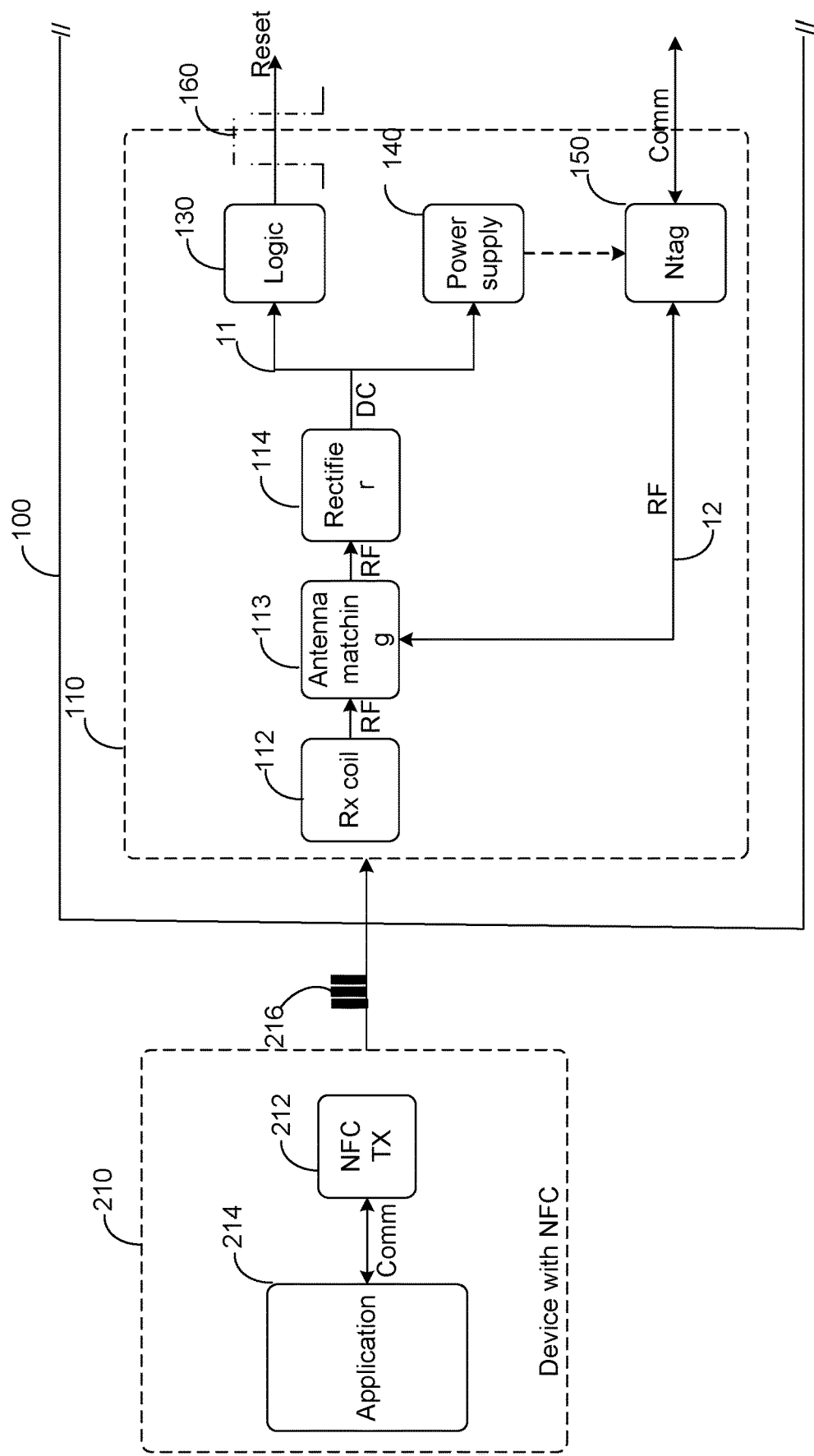
FIGS. 2A and 2B are schematic diagrams illustrating an example architecture of NFC-related components for communications between an electronic device and another electronic device, in accordance with the principles of the present disclosure.
Figure 2B:
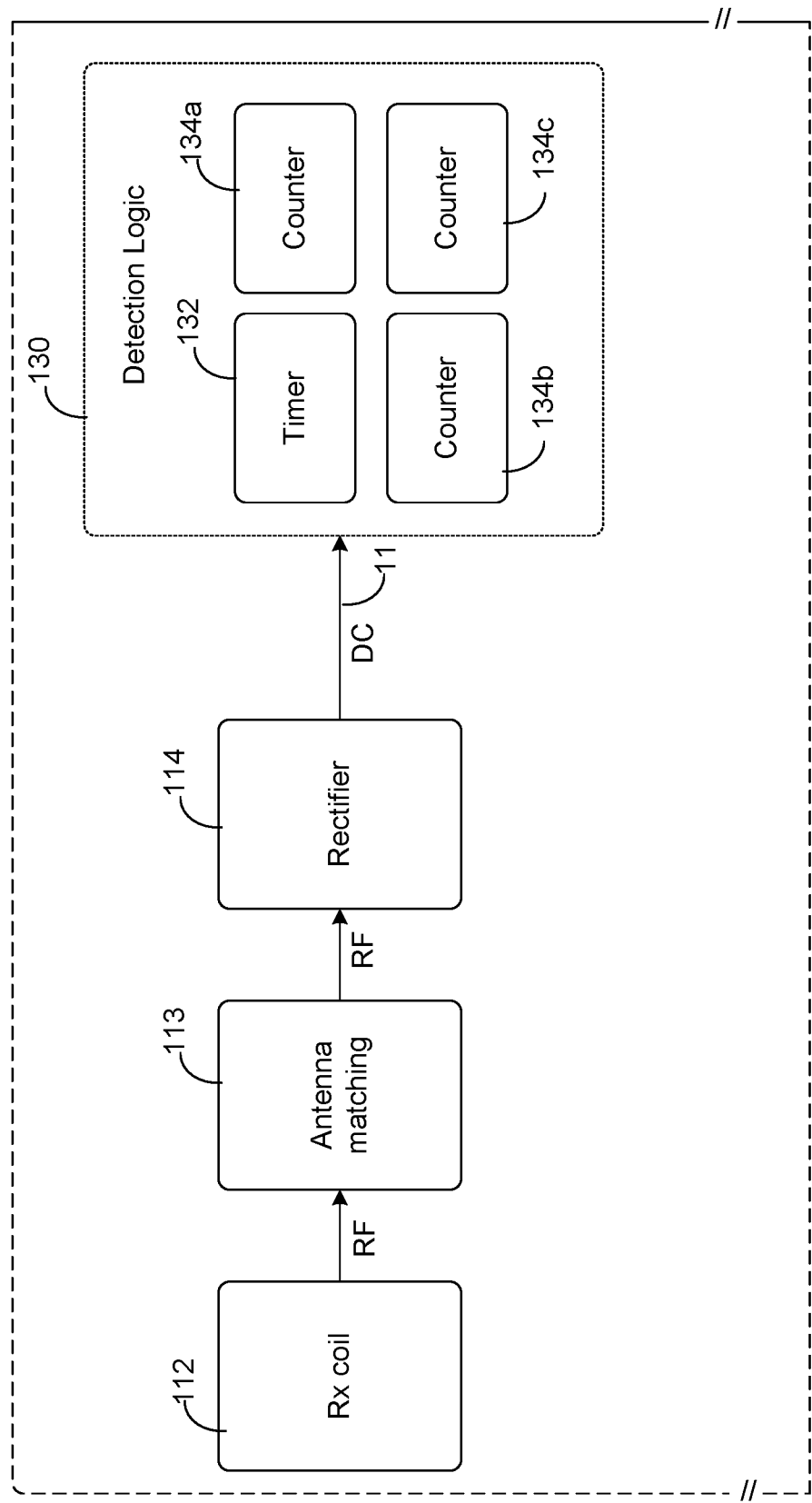

FIGS. 2A and 2B are schematic diagrams illustrating an example architecture of NFC-related components for communications between an electronic device (e.g., electronic device 100, FIG. 1) and the another electronic device (e.g., device 210) used for transmitting reset initiation or trigger signals to an NFC tag (e.g., NFC tag 110) in the electronic device, in accordance with the principles of the present disclosure.

Device 210 (e.g., a smart phone, a computer, a device with a processor and a memory, etc.) may, for example, be configured for transmitting reset initiation or trigger signals to NFC tag 110. Device 210 need not be limited to merely transmitting reset initiation or trigger signals to NFC tag 110, but may be configured for general NFC communications (including, for example, data transfers, swapping pictures and music, etc.) with electronic device 100.

As shown in FIG. 2A, device 210 may include an NFC transmitter coil (e.g., NFC-TX 212) coupled to, or under the control of, an application 214 in the device. NFC-TX 212 may be capable of being inductively coupled to an NFC receiver coil (e.g., NFC-RX 112) in NFC tag 110 when device 210 and device 100 are in contact or in close range (e.g., less than approximately 10 cm apart). NFC-TX 212 may be capable of wirelessly transmitting NFC signals at about a transmission frequency between about 13.4 and 14.0 megahertz (e.g., 13.56 megahertz) to the NFC receiver coil (e.g., NFC-RX 112 in NFC tag 110). Application 214 may be configured or programmed to transmit a specific reset trigger signal 216 from NFC-TX 212 to NFC tag 110 when resetting of device 100 is needed or instructed, for example, a user of device 210. The specific reset trigger signal 216 may have a standardized structure or waveform identifying the signal as a reset command.

Figure 3A:
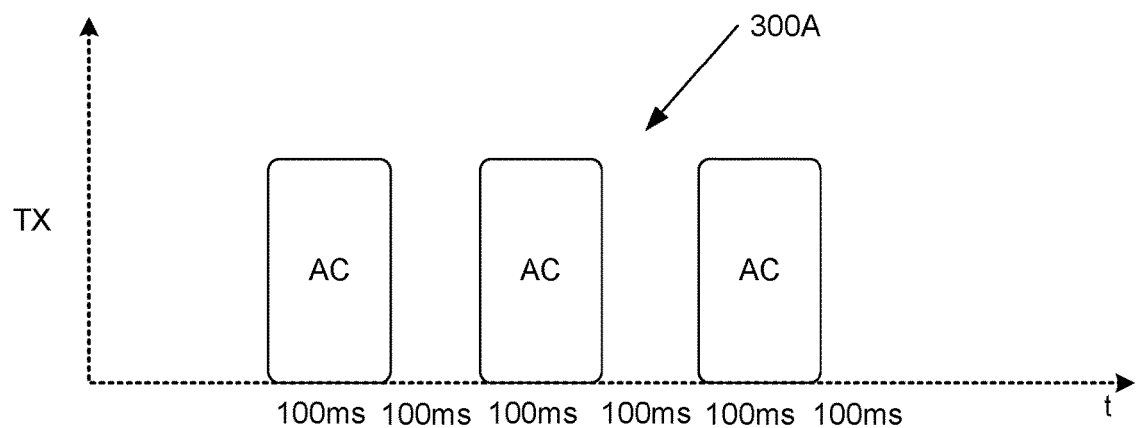
FIG. 3A illustrates an example voltage pulse train that may be transmitted wirelessly by an NFC transmitter coil in a device to an NFC receiver coil in another device, in accordance with the principles of the present disclosure.
Figure 3B:
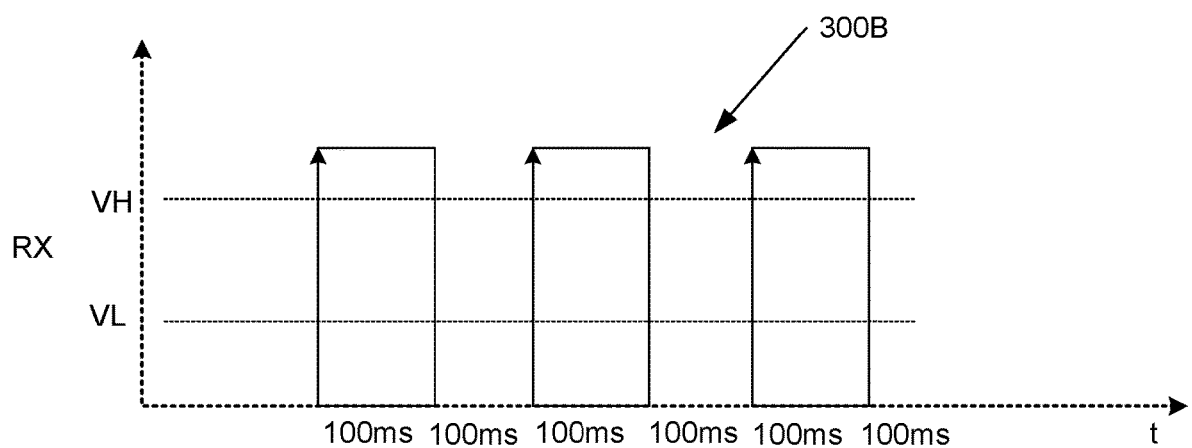
FIG. 3B shows an example signal corresponding to the voltage pulse train of FIG. 3A that may be received wirelessly by the NFC receiver coil in the another device, in accordance with the principles of the present disclosure.

The specific reset trigger signal may be a series of voltage pulses (hereinafter "pulse train") transmitted in a predefined time span or interval (TI). The specific reset trigger signal may have a predefined characteristic signature (i.e., a standardized structure or waveform) identifying the signal as a reset command, and distinguishing the signal from other NFC communications (e.g., data transfers, pictures, and music, etc.) that can occur between device 210 and device 100. In example implementations, the characteristic signature of the specific reset trigger signal identifying the signal as a reset command may be based on features such as pulse height (e.g., VH), pulse width (PW) or pulse duration (PD), pulse repetition interval (PRI), and a number of pulses (NP) in the pulse train in the predefined time span or interval (TI). In example implementations, the predefined time span or interval (TI) may be in the range of approximately 100 ms to approximately 1000 ms (e.g., 600 ms), the pulse width PW may be in the range of approximately 20 ms to approximately 200 ms (e.g., 100 ms), the pulse repetition interval (PRI) may be in the range of approximately 20 ms to approximately 200 ms (e.g., 100 ms), and the number of pulses (NP) may be in the range of approximately 2 to approximately 10 (e.g., 3). FIG. 3A shows an example pulse train 300A that may be transmitted wirelessly by NFC transmitter coil (e.g., NFC-TX 212) in device 210 to the NFC receiver coil (e.g., NFC-RX 112 in NFC tag 110. As shown in the figure, example pulse train 300A may extend over a time span TI of about 600 ms and may include three pulses (PW~100 ms, PRI~100 ms) within the time span. FIG. 3B shows an example signal 300B including three pulses (corresponding to pulse train 300A) having heights greater than VH that may be received wirelessly by the NFC receiver coil in time span TI.

The predefined characteristic signature (i.e., standardized structure or waveform) identifying a signal as a reset command may be established or set, for example, by a designer, manufacturer, or configurer of the devices (e.g., device 100 and device 210).

With reference to FIGS. 2A and 2B, NFC tag 110 in device 100 may include circuitry and logic to determine if the signal received at the NFC receiver coil (e.g., NFC-RX 112) is a reset command (e.g., by determining if the received signal has the predetermined characteristic signature of a reset command signal). NFC tag 110 may be further configured to, in response to determining that the received signal has the predetermined characteristic signature of a reset command, generate a reset signal (e.g., reset signal 160) that can be applied directly (e.g., to pin 122) to reset resettable component 120 of device 100 (FIG. 1). In example implementations, NFC tag 110 may include a logic module or circuit (e.g., logic 130) that can identify reset commands, and in response, generate and apply reset signals (e.g., reset signal 160 to reset resettable component 120, FIG. 1), and an RF communications module (e.g., Ntag 150) which decodes radio frequency (RF) signals to digital for communications (with device 100).

In example implementations, the NFC receiver coil (e.g., NFC-RX 112) in NFC tag 110 (device 100) may be coupled to an antenna impedance matching circuit (e.g., antenna matching module 113) and a rectifier (e.g., rectifier 114). The RF communications module (e.g., Ntag 150) may be coupled to antenna matching module 113.

NFC tag 110 may be configured to process RF field energy received by the NFC receiver coil along a DC path 11 and an RF path 12. Along RF path 12, NFC tag 110 may include the RF communications module (e.g., Ntag 150) which decodes radio frequency (RF) signals to digital for communications (e.g., data file transfers, swapping pictures and images, etc.) with device 100.

Figure 4:
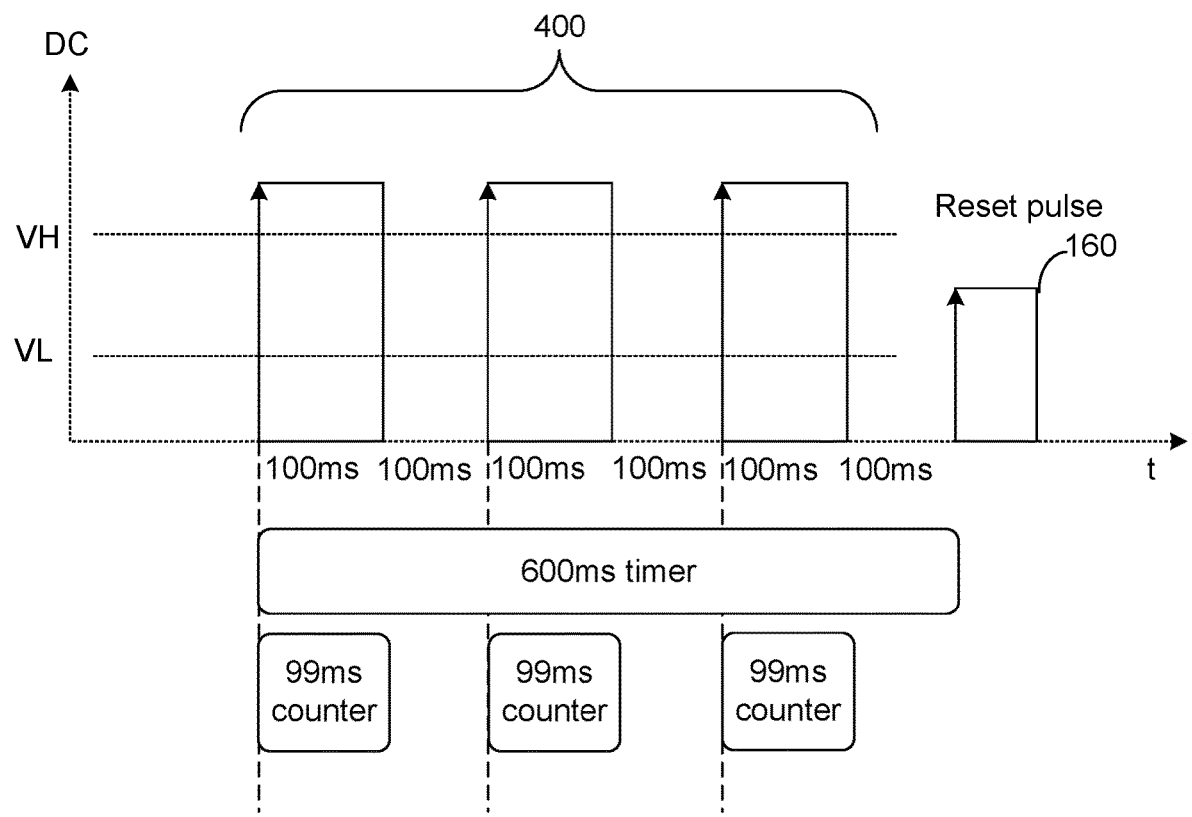
FIG. 4 illustrates a signal output of the NFC receiver coil after rectification by a rectifier, in accordance with the principles of the present disclosure.

Along DC path 11, as shown in FIG. 2A, rectifier 114 converts the received RF field energy in to a DC voltage for supplying power (shown, e.g., as power supply 140 in FIG. 2A) to energize the RF communications module (e.g., Ntag 150) and other portions of NFC tag 110. FIG. 4 shows an output signal 400 of the NFC receiver coil after rectification by rectifier 114. Further, the rectified output signal 400 of rectifier 114 is input to the logic module or circuit (e.g., logic 130) for determining whether output signal 400 has the predefined characteristic signature of a reset command.

As shown in FIG. 2B, the logic module or circuit (e.g., logic 130) may include a timer (e.g., timer 132), and one or more counters (e.g., counter 134a, 134b, 134c, etc.) (and other logic circuitry) configured to analyze pulse trains for determination or identification of the signature of output signal 400. The logic module or circuit (e.g., logic 130) may be configured to generate a reset signal (e.g., reset signal 160), responsive to a determination or identification of output signal 400 as having the predefined characteristic signature of a reset command. The logic module or circuit (e.g., logic 130) may apply the reset signal to pin 122 to reset resettable component 120 in device 100 (FIG. 1) in response to the determination or identification of output signal 400 as a reset command. In example, implementations, logic 130 may apply reset signal 160 (e.g., a voltage) to reset pin 122 for a time period of approximately 1 ms to approximately 10 ms to reset device 100.

In an example "three-pulses" scenario (shown, e.g., FIGS. 3A and 3B), the predetermined characteristic signature identifying a signal as a reset command may include three voltage pulses in a time span TI of about 600 ms. Each of the three pulses may have pulse widths (PW) of about 100 ms and pulse heights greater than a voltage threshold (VH). The pulses may have a pulse repetition interval (PRI) of about 100 ms. For this three-pulses scenario, in example implementations, the logic module or circuit (e.g., logic 130) may, for example, include a 600 ms timeout timer, three 99 ms counters that count the width of the pulses, a 1 bit shifter, and a 1 ms to 10 ms pulse trigger I/O for generating reset signal 160.

Figure 5:
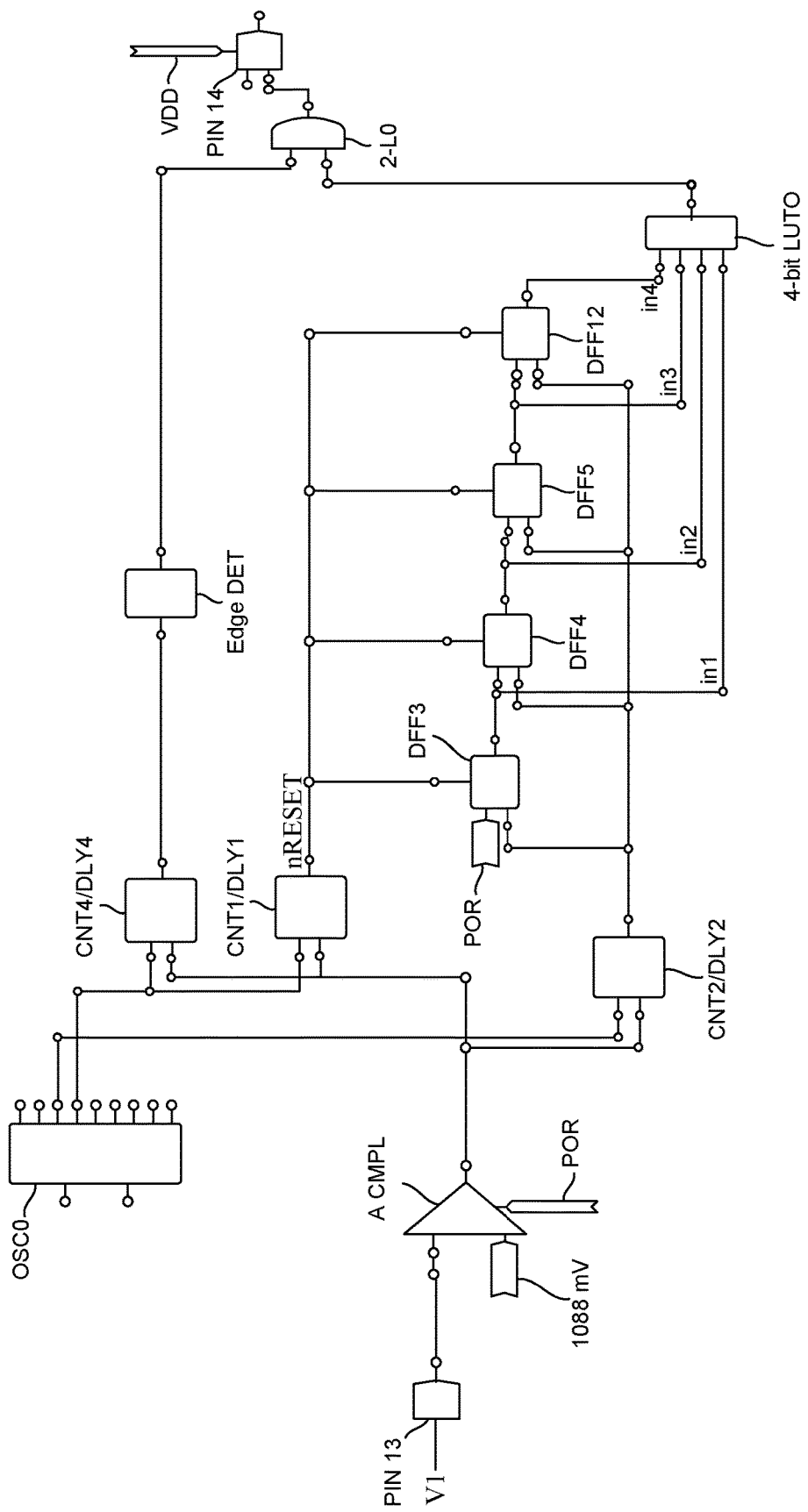
FIG. 5 illustrates an example logic circuit that can be implemented in a logic module, in accordance with the principles of the present disclosure.

FIG. 5 shows a diagram of an example logic circuit 500 that can be implemented in the logic module (e.g., logic 130) in the foregoing three-pulses scenario.

Logic circuit may have an input terminal (e.g., PIN 13) and an output terminal (e.g., PIN 14). Logic circuit 500 may receive an input signal V1 (e.g., rectifier output signal 400) at pin (e.g., PIN 3). The input signal V1 may be compared and amplified by an amplifier/comparator (e.g., A CMPOL) and processed through the several counters/timers (e.g., CNT2/DLY2, CNT1/DLY1, CNT4/DLY4) in the circuit. Logic circuit 500 may include an oscillator (e.g., OSCO) which provides a clock or timing signal for the several counters/timers (e.g., CNT2/DLY2, CNT1/DLY1, CNT4/DLY4) and other components in the circuit. Logic circuit 500 includes an edge detector (e.g., EDGE DET) coupled, for example, to counter CNT4/DLY4, and configured to detect rising and falling edges of pulses.

Logic circuit 500 further includes a series of four delay-type flip-flops (e.g., DFF3, DFF4, DFF5, DFF12), each forming a 1-bit shift register and configured to store and output whatever logic level is applied to its data terminal as long as the clock input is high. Logic circuit 500 further includes a 4-bit look up table (e.g., 4-bit LUTO) to combine outputs of the four delay-type flip-flops (e.g., DFF3, DFF4, DFF5, DFF12). Logic circuit 500 also includes a 2-level logic AND gate (e.g., 2-LO) combining the output of the edge detector (e.g., EDGE DET) and the output of the 4-bit look up table (e.g., 4-bit LUTO) to drive a reset pin (e.g., PIN 14). PIN 14 may be held at a voltage (e.g., VDD) corresponding to a voltage height of reset signal 160 for a time period (e.g., approximately 1 ms to approximately 10 ms) to reset device 100.

In example implementations, as indicated in FIG. 5 by the labels "POR," several of the components (e.g., OSCO, A CMPOL, DFF3, etc.) in logic circuit 500 may be power-on-reset (POR) components.

In an example implementation of logic circuit 500 for the three-pulses scenario (e.g., shown in FIGS. 3A and 3B), CNT1/DLY1 may be a one-shot counter that is set to generate a one-shot pulse (nRESET) having a pulse width of 600 ms, CNT4/DLY4 may be a one-shot counter that is set to generate a one-shot pulse having a pulse width of 590 ms, and EDGE DET may be set to generate a one-shot pulse (e.g., reset signal 160) having a pulse width of approximately 10 ms. CNT1/DLY1 may be delay counter set to generate an output pulse if its input stays high for more than 99 ms. The four delay-type flip-flops (e.g., DFF3, DFF4, DFF5, DFF12) may have outputs (e.g., in1, in2, in3, and in4, respectively) of zero or 1. These may be combined in the 4-bit look up table (e.g., 4-bit LUTO). when in4=0, in3=1, in2=1, and in1=1 (e.g., corresponding to the detection of three pulses~100 ms wide in an input signal V1 (e.g., rectifier output signal 400) in a time span of 600 ms. The output of the 4-bit LUTO is logically combined with the output of the edge detector (e.g., EDGE DET) to apply reset signal 160 for 10 ms to reset device 100.

Figure 6:
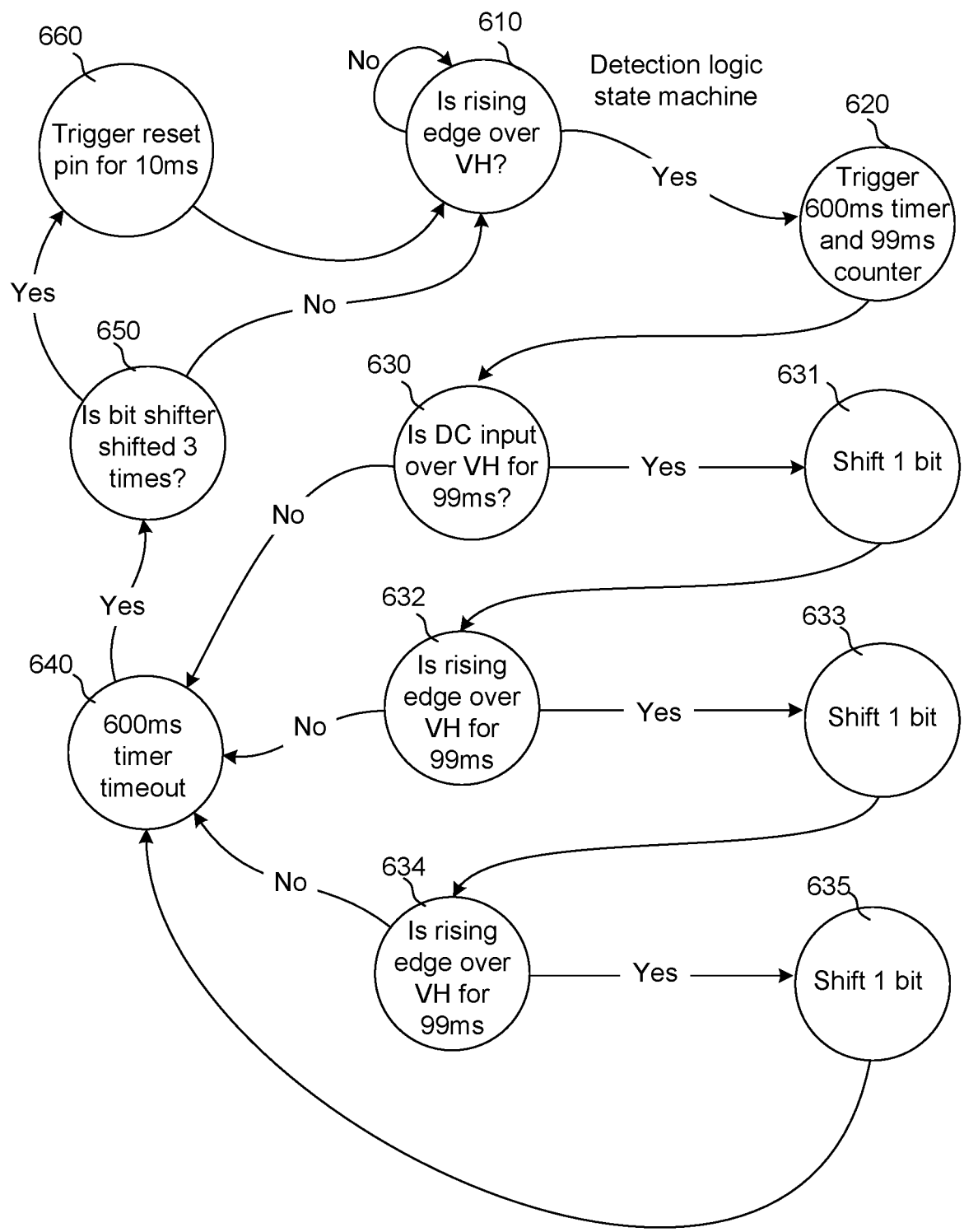
FIG. 6 is an example state machine diagram illustrating states of the logic circuit of FIG. 5.

FIG. 6 is an example state machine 600 diagram illustrating logic states of logic circuit 500/logic 130 implemented in the foregoing three-pulses scenario of FIG. 5.

As shown in FIG. 6, in state 610, logic 130 is determining if a rising edge is greater than VH. If the rising edge is not greater than VH, logic 130 returns to state 610. If the rising edge is greater than VH, logic 130 triggers the 600 ms timer and the 99 ms counters (state 620) and moves to state 630.

In state 630, logic 130 determines if the DC input is greater than VH for 99 ms. If the DC input is not greater than VH for 99 ms, logic 130 moves to state 640. If the DC input is greater than VH for 99 ms, logic 130 shifts a count register by 1 bit (state 631) and moves to state 632.

In state 632, logic 130 determines if the rising edge is greater than VH for 99 ms. If the DC input is not greater than VH for 99 ms, logic 130 moves to state 640. If the DC input is greater than VH for 99 ms, logic 130 shifts a count register by 1 bit (state 633) and moves to state 634.

In state 634, logic 130 determines if the rising edge is greater than VH for 99 ms. If the DC input is not greater than VH for 99 ms, logic 130 moves to state 640. If the DC input is greater than VH for 99 ms, logic 130 shifts a count register by 1 bit (state 635) and moves to state 640.

In state 640, logic 130 determines if the 600 ms timer has timed out. If the 600 ms timer has timed out, logic 130 moves to state 650.

In state 650, logic 130 determines whether the count register has shifted three times (e.g., 1-bit each at states 632, 634, and 636). If the count register has not shifted three times, logic 130 returns to state 610. If the count register has shifted three times, logic 130 moves to state 660.

In state 660, logic 130 triggers the reset pin (e.g., pin 14, FIG. 5) for 10 ms to reset device 100, and returns to state 610.

FIG. 7A shows an example method 700A for initiating or triggering resetting of a target electronic device from an electronic device, in accordance with the principles of the present disclosure.

Method 700A includes establishing a near field communications (NFC) channel from the electronic device to the target electronic device (710), and sending a wireless signal from the electronic device to the target electronic device over the NFC channel (720). The wireless signal has a predefined characteristic signature of a reset command signal for resetting the target electronic device. In example implementations, the predefined characteristic signature of the reset command signal for resetting the target electronic device includes a predefined number of voltage pulses transmitted over a predefined time interval in the reset command signal. Further, in method 700A, establishing the NFC channel from the electronic device to the target electronic device includes inductively coupling an NFC transmitter coil in the electronic device to an NFC receiver coil in the target electronic device.

FIG. 7B shows an example method 700B for resetting a target electronic device, in accordance with the principles of the present the present disclosure. The target electronic device may, for example, be any one of handheld devices (e.g., smartphones and the like), wearable devices such as hand and/or wrist worn devices (e.g., smart watches, smart bracelets, smart rings and the like), head mounted devices (smart glasses, goggles, headsets and the like), ear worn devices, neck worn lanyard devices, other mobile devices (tablet computing devices, laptop computing devices and the like), desktop computing devices, smart televisions, smart speakers, and other such devices.

Resetting the target electronic device may involve a hardware reset (or hard reset) by a hardware operation that re-initializes the target electronic device (or a device component) from any state. The hardware reset ends all software operations and restarts the device. The hardware reset can be performed without any software involvement (in other words, it cannot be masked or performed by a piece of software).

Method 700B includes establishing a wireless near field communications (NFC) channel to the target electronic device (730), and receiving a wireless signal at the target electronic device over the NFC channel (740). The method further includes comparing a signature of the received wireless signal with a predefined characteristic signature of a reset command signal (750), and responsive to the comparing, generating a reset signal resetting the target electronic device (760).

Establishing a wireless near field communications (NFC) channel to the target electronic device 730 may include deploying an NFC tag in the target electronic device. The NFC tag may include an NFC receiver coil, which may be coupled to an antenna impedance matching circuit, a rectifier, and a logic circuit configured to determine the signature of the received wireless signal.

Receiving a wireless signal at the target electronic device over the NFC channel 740 may include rectifying the received wireless signal for input to the logic circuit.

Figure 8:
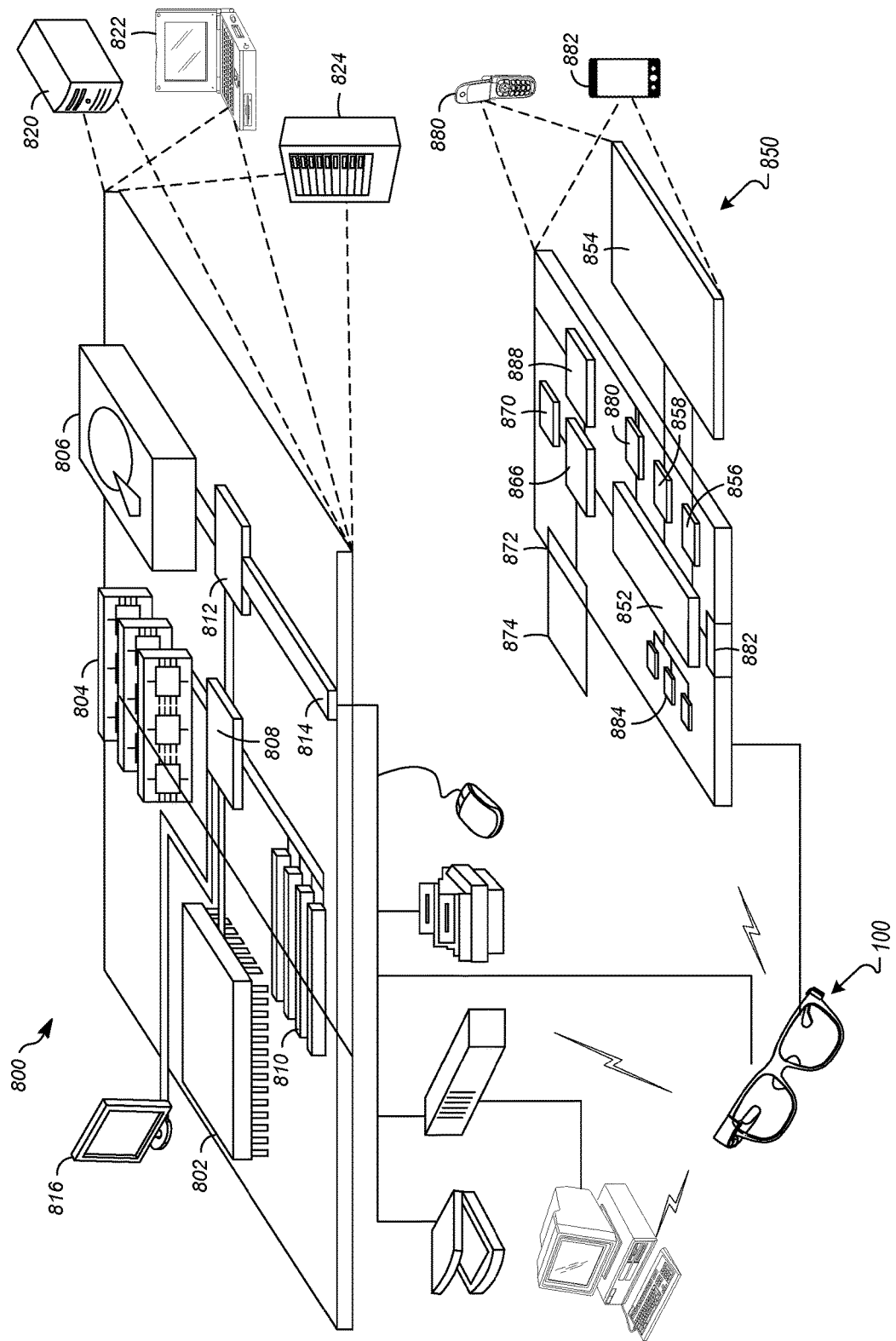
FIG. 8 is an illustration of a generic computer device and a generic mobile computer device coupled to the example electronic device of FIG. 1, in accordance with the principles of the present disclosure.

FIG. 8 shows an example of a generic computer device 800 and generic mobile computer devices 850, which may be used with recording system 10 and consumer electronic devices (such as electronic device 100, FIG. 1)) and with the techniques described herein. Computing device 800 is intended to represent various forms of digital computers, such as laptops, desktops, tablets, workstations, personal digital assistants, televisions, servers, blade servers, mainframes, and other appropriate computing devices. For example, computing device 800 may be and/or be used as the server referenced above. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 808 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 866, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA 800, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described herein), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

What is claimed is:

1. A method, comprising:
   receiving a wireless signal at a target electronic device;
   comparing a signature of the wireless signal with a predefined characteristic signature of a hard power reset command signal; and
   responsive to comparing the signature, generating a hard power reset signal resetting power to the target electronic device.

2. The method of claim 1, wherein receiving the wireless signal at the target electronic device includes deploying an NFC tag in the target electronic device.

3. The method of claim 2, wherein the NFC tag includes an NFC receiver coil configured to receive the wireless signal, a rectifier, and a logic circuit configured to determine the signature of the wireless signal.

4. The method of claim 3, wherein receiving a wireless signal at the target electronic device includes rectifying the wireless signal for input to the logic circuit.

5. The method of claim 4, wherein the predefined characteristic signature is based on a number of voltage pulses transmitted over a predefined time interval in the hard power reset command signal, and wherein the logic circuit determines, for comparison, the number of voltage pulses received over the predefined time interval in the wireless signal.

6. The method of claim 5, wherein the predefined time interval is in a range of 100 ms to 1000 ms, wherein the number of voltage pulses is in a range of 2 to 10 voltage pulses.

7. The method of claim 5, wherein the predefined characteristic signature is further based on pulse widths of the number of voltage pulses in the hard power reset command signal, and wherein the logic circuit determines, for comparison, the pulse widths of the number of voltage pulses received over the predefined time interval in the wireless signal.

8. The method of claim 7, wherein the number of voltage pulses have pulse widths in a range of 20 ms to 200 ms and pulse repetition intervals in a range of 20 ms to 200 ms.

9. An electronic device, comprising:
   a near field communications (NFC) tag coupled to a resettable component of the electronic device, the NFC tag including:
   an NFC receiver coil configured to receive a wireless signal;
   a rectifier configured to rectify the wireless signal to a rectified wireless signal; and
   a logic circuit configured to determine whether a signature of the rectified wireless signal corresponds to a predefined characteristic signature of a reset command signal, and responsive to the determination, apply a hard power reset signal to the resettable component of the electronic device.

10. The electronic device of claim 9, wherein the resettable component is a system-on-chip (SOC) of the electronic device.

11. The electronic device of claim 9, wherein the resettable component is a power management integrated circuit (PMIC) of the electronic device.

12. The electronic device of claim 9, wherein the logic circuit includes at least a timeout timer, one or more counters that count widths of voltage pulses in the rectified wireless signal, a 1 bit shifter, and a pulse trigger I/O for generating the hard power reset signal.

13. The electronic device of claim 12, wherein the logic circuit is configured to apply the hard power reset signal to the resettable component of the electronic device for a time period between 1 ms to 10 ms.

14. The electronic device of claim 9, wherein the logic circuit includes one or more components that are power-on-reset (POR) components.

15. The electronic device of claim 9, wherein the predefined characteristic signature is based a number of voltage pulses transmitted over a predefined time interval in the reset command signal, and wherein the logic circuit determines, for comparison, a number of voltage pulses received over the predefined time interval in the wireless signal.

16. The electronic device of claim 15, wherein the predefined time interval is in a range of 100 ms to 1000 ms, and wherein the number of voltage pulses is in a range of 2 to 10 voltage pulses.

17. The electronic device of claim 15, wherein the predefined characteristic signature is further based on pulse widths of the number of voltage pulses in the reset command signal, and wherein the logic circuit determines, for comparison, the pulse widths of the number of voltage pulses received over the predefined time interval in the wireless signal.

18. The electronic device of claim 17, wherein the number of voltage pulses have pulse widths in a range of 20 ms to 200 ms and pulse repetition intervals in a range of 20 ms to 200 ms.

19. The electronic device of claim 9, wherein the NFC tag is configured to process radio frequency (RF) field energy received by the NFC receiver coil along a DC path and an RF path, and configured to decode RF signals to digital for communications with the electronic device along the RF path.

20. The electronic device of claim 19, wherein the NFC tag is configured to convert the RF field energy in to a DC voltage for supplying power to portions of the NFC tag.

21. A method, comprising:
establishing a near field communications (NFC) channel from an electronic device to a target electronic device; and
sending a wireless signal from the electronic device to the target electronic device over the NFC channel, the wireless signal having a predefined characteristic signature of a hard power reset command signal for resetting power to the target electronic device.

22. The method of claim 21, wherein establishing an NFC channel from the electronic device to the target electronic device includes inductively coupling an NFC transmitter coil in the electronic device to an NFC receiver coil in the target electronic device.

23. The method of claim 21, wherein the predefined characteristic signature of the hard power reset command signal for resetting power to the target electronic device includes a predefined number of voltage pulses transmitted over a predefined time interval in the hard power reset command signal.

* * * * *

UNITED STATES PATENT AND TRADEMARK OFFICE
CERTIFICATE OF CORRECTION

| | | |
|---|---|---|
| PATENT NO. | : 12,052,068 B2 | Page 1 of 1 |
| APPLICATION NO. | : 17/661465 | |
| DATED | : July 30, 2024 | |
| INVENTOR(S) | : Yeh et al. | |

It is certified that error appears in the above-identified patent and that said Letters Patent is hereby corrected as shown below:

In the Claims

In Column 13, Claim 15, Line 2, delete "based" and insert -- based on --, therefor.

In Column 14, Claim 20, Line 2, delete "in to" and insert -- into --, therefor.

Signed and Sealed this
Seventh Day of January, 2025

Derrick Brent
*Acting Director of the United States Patent and Trademark Office*